United States Patent [19]

Baines

[11] Patent Number: 4,728,835
[45] Date of Patent: Mar. 1, 1988

[54] ELECTRIC MOTORS

[75] Inventor: Roger F. Baines, Repulse Bay, Hong Kong

[73] Assignee: Johnson Electric Industrial Manufactory Limited, Chaiwan, Hong Kong

[21] Appl. No.: 913,758

[22] Filed: Sep. 30, 1986

[30] Foreign Application Priority Data

Oct. 4, 1985 [GB] United Kingdom ................ 8524528

[51] Int. Cl.⁴ .......................................... H02K 11/00
[52] U.S. Cl. ...................................... 310/71; 310/42; 310/89; 310/239
[58] Field of Search .............. 310/239, 241, 242, 245, 310/238, 42, 46, 177, 71, 89, 40 MM, 246, 247; 29/596, 597

[56] References Cited

U.S. PATENT DOCUMENTS 3,445,692  5/1969  Kato ...................................... 310/46
3,600,615  8/1971  Morita ................................... 310/42
4,157,483  6/1979  Frimley ............................... 310/242

FOREIGN PATENT DOCUMENTS 2404328  5/1979  France ................................... 310/89
0846196  8/1960  United Kingdom .......... 310/71 UX
2013042  8/1979  United Kingdom ................. 310/71

Primary Examiner—R. Skudy
Attorney, Agent, or Firm—Fleit, Jacobson, Cohn & Price

[57] ABSTRACT

A direct current electric motor comprises a cylindrical casing of electrically conductive material, a stator magnet or magnets and a wound rotor, provided with a commutator, accommodated in the casing, an end cap in one end of the casing, and brush holding devices supported by the end cap. The brush holding devices have terminals which extend through the end cap for connection to an electric supply. A recess is provided in the end cap so as to extend between one of the terminals and the casing and a portion of the casing has been deformed so as to extend into the recess and make electrical contact with the one terminal.

6 Claims, 3 Drawing Figures

U.S. Patent   Mar. 1, 1988   4,728,835
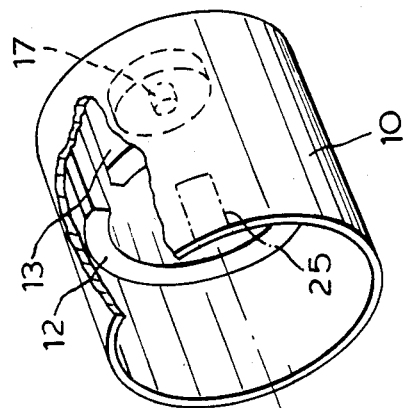
FIG. 1.
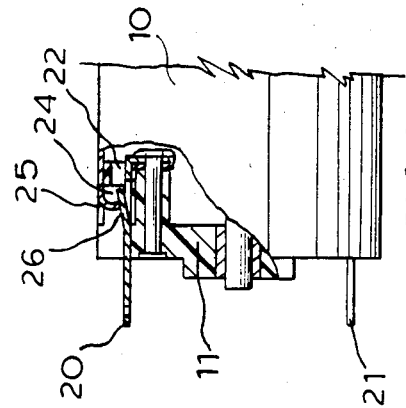
FIG. 2.
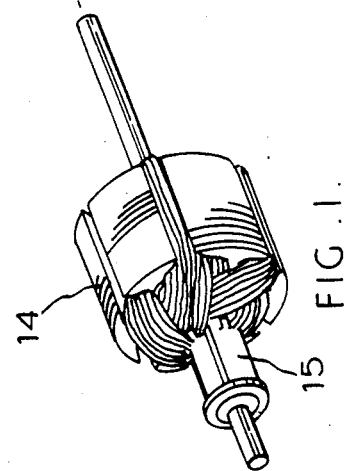
FIG. 3.
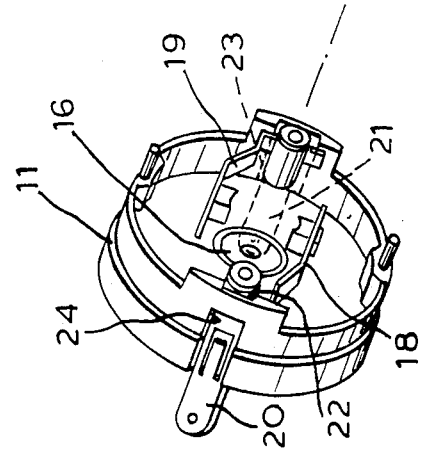

ELECTRIC MOTORS

This invention relates to electric motors, more particularly direct current electric motors, and to a method of grounding same.

It is known for small direct current electric motors to have a cylindrical metal casing accommodating the stator magnets and the rotor, and an electrically-insulated end cap which fits into an open end of the casing and which carries the brush gear. It is sometimes desirable to ground a brush terminal of the brush gear by connecting it to the metal casing and the present invention seeks to provide a convenient way of doing this.

In one aspect the invention provides a direct current electric motor comprising a cylindrical casing of electrically conductive material, a stator magnet or magnets and a wound rotor, provided with a commutator, accommodated in the casing, an end cap in one end of the casing, and brush holding devices supported by the end cap in electrically non-conductive relationship therewith, the brush holding devices having terminals which extend through the end cap for connection to an electric supply, wherein a portion of the casing has been deformed so as to make electrical contact with one of said terminals.

Preferably, a recess is provided in the end cap so as to extend between said one terminal and the casing and wherein said portion of the casing extends into said recess.

In another aspect the invention provides a method of grounding a direct current electric motor comprising a cylindrical casing of electrically conductive material, a stator magnet or magnets, a wound rotor provided with a commutator, an end cap and brush holding devices supported by the end cap, the brush holding devices having terminals which extend through the end cap for connection to an electric supply, and the end cap having a recess which extends from one of said terminals to the peripheral wall of the end cap, wherein, after the stator magnet or magnets and the rotor have been arranged in the casing and the end cap has been fitted in one end of the casing, a portion of the casing is deformed so as to extend into the recess and make electrical contact with said one terminal.

The invention will now be more particularly described, by way of example, with reference to the accompanying drawings, in which:

FIG. 1 is an exploded perspective view of one embodiment of a motor according to the invention, with a part of the casing cut away;

FIG. 2 is a view partly in section showing a detail of the motor of FIG. 1, and

FIG. 3 is a fragmentary perspective view showing the motor casing with a modification thereto.

Referring now to the drawings, the motor shown therein in a d.c. micromotor and comprises a cylindrical steel can-like casing 10 which is closed at one end and a plastics end cap 11 which is fitted in the other end of the casing. Two stator magnets 12 and 13 (although a single ring magnet could be used instead) are fixed within the casing and a wound rotor 14 provided with a commutator 15 is supported for rotation within the casing and between the stator magnets by bearings 16 and 17 mounted, respectively, in the end cap 11 and in the closed end of the casing 10.

The end cap 11 supports two brush holders 18 and 19. The brush holders 18 and 19 have integral terminals 20 and 21, respectively, which extend through apertures 22 and 23, respectively, in the end cap 11.

As mentioned previously, it is sometimes desirable to connect one of the terminals 20 to the motor casing 10. This is of particular advantage, for instance, in motor vehicles where the casing 10 is connected to the metal chassis of the vehicle, in order to simplify complex wiring looms.

To achieve this, a recess 24 is provided in the outer end portion of the end cap 11 and extends radially from the aperture 22 to the peripheral wall of the end cap. A sliver 25 of the casing (in the form of a longitudinally extending finger portion) is then peened over so as to extend into the recess 24 and make electrical contact with the terminal 20. This is done at the final stage of assembly of the motor and can be optional depending upon whether or not the terminal 20 is to be grounded. In can also be done simultaneously with the turning over of small tab-like portions (not shown) of the casing which hold the end cap 11 firmly in place.

To ensure permanent contact between the sliver 25 and terminal 20 it is preferable to provide the terminal 20 with a resilient portion, with which the sliver 25 makes contact. This resilient portion may be, for instance, in the form of a projection 26 partially cut and bent out of the plane of the terminal 20.

It is also sometimes desirable to make a gas-tight connection between the terminal 20 and the sliver 25 particularly when the motor is to be used in hazardous environments. This can be achieved by coating the terminal 20 (conveniently of brass) with an appropriate tin/lead mixture and ensuring that as the sliver 25 is peened over its free end sweeps the surface of the terminal 20 to cause the tin/lead mixture to flow around the region of contact between the silver 25 and the terminal 10.

The above-described grounding arrangement is very cost-effective and provides only a single contact to galvanic action. It does moreover only involve a single additional step in the assembly process and allows motors which are to be grounded and not grounded to be made from identical component parts.

In some motors, the distance between the terminal and the casing and/or the extent to which the end cap fits into the casing may mean that a portion of the casing cannot be deformed to make contact with the terminal. In such motors, the casing can be provided at its open end with an integral longitudinally projecting extension 27 (see FIG. 3) which can be bent over to make contact with the terminal. Indeed the extension 27 could be made longer than shown in FIG. 3 in which case it may be possible to do without the recess 24 in the end cap and to deform the extension 27 to make contact with the terminal 20 externally of the end cap and motor casing.

Furthermore, the end cap 11 need not be wholly of electrically insulating material. It could instead be of say metal, coated with electrically insulating material or provided with parts of electrically insulated material fitted thereto.

Other modifications may be apparent to persons skilled in the art without departing from the scope of the invention defined in the appendant claims.

I claim:

1. A direct current electric motor comprising a cylindrical casing (10) of electrically conductive material, a stator magnet means (12, 13) and a wound rotor (14), provided with a commuator (15), accommodated in the casing, an end cap (11) in one end of the casing, and brush holding device (18, 19) supported by the end cap in electrically non-conductive relationship therewith, the brush holding devices having terminals (20, 21) which extend through the end cap for connection to an electric supply, wherein the casing has a deformed portion in contact with one of said terminals (20) to provide electrical connection between the casing and said one of the terminals.

2. The motor of claim 1, wherein a recess is provided in the end cap so as to extend between said one terminal and the casing and wherein said deformed portion of the casing extends into said recess.

3. The motor of claim 1, wherein said one terminal has a resilient portion with which the deformed portion of the casing makes contact.

4. The motor of claim 3, wherein said resilient portion is partially cut and bent out of the plane of said one terminal.

5. The motor of claim 1, wherein the deformed portion of the casing is a finger portion.

6. The motor of claim 1, wherein said one terminal is coated with a tin/lead mixture whereby a gas-tight connection is made between the deformed portion of the casing and said one terminal.

* * * * *